United States Patent [19]
Omori et al.

[11] 3,966,597
[45] June 29, 1976

[54] OIL OR ORGANIC SOLVENT-ABSORBENT

[75] Inventors: Akira Omori; Isao Okamura; Tadasi Imoto, all of Sagamihara; Takayuki Katoh, Tokyo, all of Japan

[73] Assignee: Teijin Limited, Osalin, Japan

[22] Filed: Dec. 5, 1974

[21] Appl. No.: 529,907

Related U.S. Application Data

[63] Continuation-in-part of Ser. No. 360,534, May 15, 1973, abandoned, which is a continuation-in-part of Ser. No. 136,511, April 22, 1971, abandoned.

[30] Foreign Application Priority Data

July 28, 1970   Japan.............................. 45-65893

[52] U.S. Cl.................................. 210/39; 156/85; 156/229; 156/244; 210/DIG. 21; 260/2.5 E; 264/51; 264/210 R; 264/230; 264/237; 264/282; 264/DIG. 8; 264/DIG. 47; 428/253; 428/315

[51] Int. Cl.².................. B01D 15/02; B29D 27/00; B32B 31/14

[58] Field of Search............ 264/51, 53, 54, DIG. 8, 264/DIG. 47, 210 R, 230, 237, 282; 156/85, 229, 244; 210/24, 21 P

[56] References Cited
UNITED STATES PATENTS

| | | | |
|---|---|---|---|
| 3,003,304 | 10/1961 | Rasmussen..................... | 264/DIG. 8 |
| 3,539,666 | 11/1970 | Schirmer....................... | 264/51 |
| 3,549,470 | 12/1970 | Greenwald et al............. | 264/DIG. 8 |
| 3,562,369 | 2/1971 | Chopra et al................... | 264/51 X |
| 3,611,699 | 10/1971 | Wininger et al. ............. | 264/DIG. 8 |
| 3,744,638 | 7/1973 | Rhodes...................... | 210/DIG. 21 P |
| 3,800,950 | 4/1974 | Hess et al. ................ | 210/DIG. 21 P |
| 3,819,514 | 6/1974 | Clampitt et al............ | 210/DIG 21 P |
| 3,862,963 | 1/1975 | Hoshi et al. ............... | 210/DIG. 21 P |

FOREIGN PATENTS OR APPLICATIONS

| | | | |
|---|---|---|---|
| 1,192,132 | 5/1970 | United Kingdom.............. | DIG. 8/ |
| 1,157,299 | 7/1969 | United Kingdom.............. | DIG. 8/ |
| 1,171,971 | 11/1969 | United Kingdom.............. | DIG. 8/ |

*Primary Examiner*—Philip Anderson
*Attorney, Agent, or Firm*—Sherman & Shalloway

[57] ABSTRACT

An oil or organic solvent-absorbent is prepared by extruding a molten thermoplastic resinous polymer blend of polystyrene and polyethylene containing a foaming agent through a die having a slit aperture of 0.1 – 1.0 mm width, quenching the extrudate at the die exit to a temperature below the glass transition point of the resinous blend, drafting the extrudate at a draft ratio from the maximum draft ratio possible under the operating conditions to one-third the maximum draft ratio, laminating at least two sheets of the resulting unopened, sheet-like reticulated structure having numerous non-continuous cracks along one direction so that the direction of the cracks of each such sheet is the same, pulling the laminate in a direction perpendicular to the direction of the cracks to separate the constituent fibers from each other, and crimping the opened, sheet-like laminate either alone or together with at least one other sheet-like material; a process for removing oil or organic solvents with the absorbent product.

27 Claims, 4 Drawing Figures

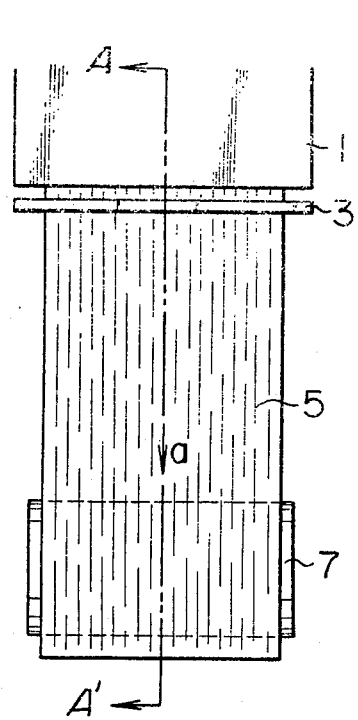
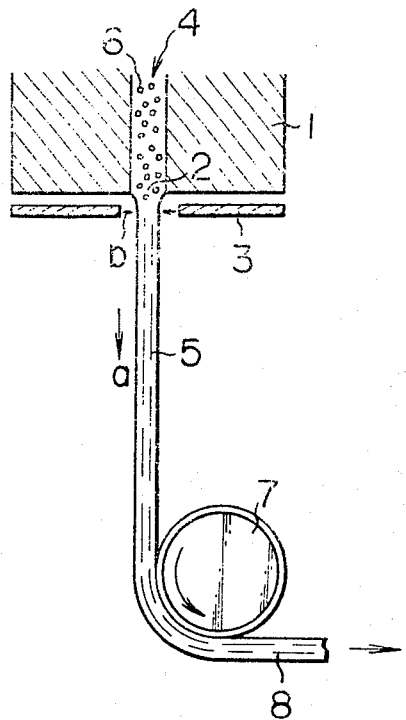
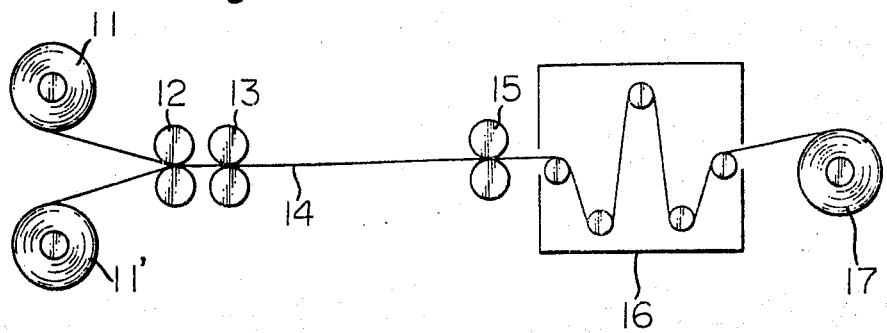
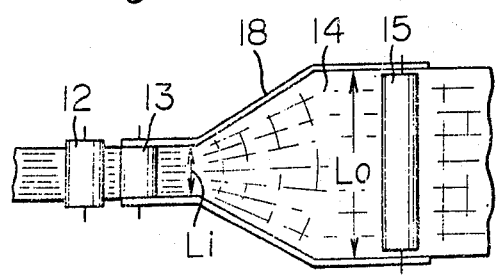

OIL OR ORGANIC SOLVENT-ABSORBENT

This application is a continuation-in-part application of U.S. Pat. Ser. No. 360,534 filed May 15, 1973 and now abandoned which is a continuation-in-part application of U.S. Pat. Ser. No. 136,511 filed Apr. 22, 1971, and now abandoned.

This application is related to applicant's co-pending applications U.S. Pat. Ser. No. 485,365 filed July 3, 1974 and U.S. Pat. Ser. No. 464,906 filed Apr. 29, 1974 and U.S. Pat. Ser. No. 263,443 filed Apr. 22, 1971 and now abandoned.

This invention relates to an oil or organic solvent-absorbent for absorbing or removing oils which have flowed onto the surfaces of the sea or rivers or other bodies of water as a result of accidents of tankers such as collision or stranding; for absorbing or removing waste oils discharged from industrial establishments, or for absorbing or removing oil or organic solvent which has flowed onto any water surface for any other reasons, and for absorbing or removing various solvents which are present in air or waste water in a floating, suspended or dissolved state.

Previously, such oils or organic solvents have been removed by absorbing them with straws or woven straws or oil-absorbing materials such as perlite. But these materials have been found unsatisfactory because of lack of oil absorbability and difficulty of treatment after absorption. Furthermore, no practice has previously been developed to remove solvents afloat in air as a result of spray coating of paints, for example, or those afloat on, or suspended or dissolved in water or waste water. The absorbtion and removal of these solvents can be performed by using activated carbon, but activated carbon is not commercially feasible because of its high cost, short lifetime and complexity of regeneration. A fibrous assembly using polypropylene has also been used for this purpose, but has not proved satisfactory in its oil absorbing capacity. Recently, an apparatus called "oil skimmer" has been developed, but it is difficult to recover large quantities of oils within short periods of time.

It has now been found that an oil or solvent-absorbing material capable of absorbing oils or solvents in great quantities at high rates can be provided by utilizing the sheet-like reticulated fibrous structures which are produced according to the particular method proposed in our co-pending application U.S. Pat. Ser. No. 464,906 filed Apr. 29, 1974 which comprises extruding a molten mixture of a certain thermoplastic polymer blend and a blowing agent through a die having a slit clearance of 0.1 - 1.0 mm, quenching the extrudate at the die exit to a temperature below the glass transition point of the polymer blend, drafting the extrudate at a draft ratio between the maximum draft ratio possible under the conditions and one-third the maximum draft ratio.

According to this invention, there is provided a process for the preparation of an oil or organic solvent-absorbent, which comprises:

a. extruding a molten mixture of a resinous blend consisting essentially of 60 to 99 parts by weight of polystyrene and 1 to 40 parts by weight of polyethylene and a foaming substance through a die with a slit clearance of 0.1 - 1.0 mm;

b. quenching the extrudate at a point less than 5 mm away from the die surface to a temperature below the glass transition temperature of the resinous blend;

c. simultaneously drafting the extrudate at a draft ratio between the maximum draft ratio possible under the conditions and one-third thereof, thereby fibrillating the extrudate just as it leaves the die exit;

d. laminating at least two sheets of the thus obtained unopened, unseparated, sheet-formed and reticulated fibrous structures having numerous non-continuous cracks along one direction in a manner such that the directions of the fibers of these structures are identical to each other;

e. pulling the laminate in the direction perpendicular to the direction of the fibers to open the same; and f. subjecting the opened, sheet-formed laminate to heat shrinking treatment at a temperature ranging from 80° to 150°C.

The absorbent produced according to this invention is characterized by far greater rates and amounts of absorbtion of oils or solvents than the conventional absorbents of this kind, small apparent density, and reusability upon regeneration.

The basic feature of the process of this invention is that a particular resinous blend is used as a starting material, and it is fibrillated by a particular method, followed by heat-shrinking the fibrillated product.

In this invention, it was found that for use as an oil or organic solvent-absorbent, a blend of polystyrene and polyethylene is highly suitable in view of its oil or organic solvent absorbability, resistance to oil or organic solvent, cost, productivity and the like. Such resinous blend may consist essentially of 60 to 99 parts by weight, preferably 75 to 98 parts by weight, of polystyrene and 1 to 40 parts by weight, preferably 2 to 25 parts by weight, of polyethylene. The polystyrene may be of any kind, but atactic polystyrenes are especially suitable. The polyethylene may either be of high density or low density, and low density polyethylenes are preferable.

Furthermore, the resinous blend is able to contain a small amount, usually less than 1 part by weight, of an additive, e.g., a lubricant such as talc, a coloring material, other thermoplastic polymer, plasticizer, filter, flame-resisting agent and the like.

According to this invention, first an unopened, sheet-like and reticulated fibrous structure is made from the above mentioned resinous blend. That is, the resinous blend is admixed with a foaming agent in the molten state. The resulting molten mixture is extruded through a die having a slit aperture of 0.1 – 1.0 mm in width, quenched at the die exit to a temperature below the glass transition temperature of the blend, and drafted at a draft ratio of from the maximum draft ration possible under the operating conditions to one-third the maximum draft ratio.

The process of the present invention can be distinguished from the prior methods of fibrillating thermoplastic resin films primarily by the steps of quenching the molten resinous composition extruded from the die at a zone less than 5 mm away from the die surface, i.e., quenching the extrudate almost simultaneously as it leaves the die exit, and drawing the extrudate at a particular draft ratio simultaneously with the extrusion.

Thus according to the process of this invention, the two-staged step as in the prior fibrillating methods, i.e., to extrude the foamed sheet and fibrillate the foamed sheet with a mechanical means can be dispensed with;

the sheet-formed and reticulated fibrous structures are formed by extruding and at the same time fibrillating the molten resinous composition. In addition, according to the process of this invention, the resulting fibrous structures are composed of very fine fibers running in one direction, said fibers being cross-linked in the longitudinal direction to form a mesh, the nodes of fibers being very fine, so that the entire fibrous structures are rich in pliability.

Generally speaking, the term "glass transition temperature" (hereinafter abbreviated as "Tg") means the temperature at which the thermoplastic resin changes from a flexible rubbery state to a brittle glassy state, or vice versa, and at which discontinuity will occur in the specific volume (cubical thermal expansion coefficient) — temperature curve as measured by the method specified by ASTM Designation: D 864-52. Generally, Tg of the thermoplastic resin varies depending on its molecular weight, content of plasticizer added, degree of cross linking and crystallinity, and in the case of a copolymer or a blend of resins, Tg varies with the degree of copolymerization or ratio of blend. Tg often is not a definite temperature but has a certain temperature range. Also, certain types of copolymers or resinous blends may have two or more Tg's depending on the monomer combination of the copolymer, types and ratios of polymer in the blend and the like. It is theoretically assumed that the resinous blend of polystyrene and ployethylene which is used in the process of this invention has also two Tg's. However, in this specification, when we refer to Tg of the resinous blend, we mean only the higher one of the two Tg's of the resinous blend. This is because only the higher one is important in carrying out the process of this invention, and the lower one can be put out of consideration.

The term "maximum draft ratio" represents a maximum range within which the thermoplastic resin articles when being drafted under determined conditions, do not undergo breakage.

The term "foaming or blowing agent" is used in this specification to signify a substance which can form foams either before or as the resin composition containing it leaves the die. Useful foaming agents include:
1. Gases which are substantially inert to the molten polymer blend such as nitrogen, carbon dioxide, helium, etc.
2. Organic liquids which are gasified at the time of melting or extruding the polymer blend to remarkably increase the volume of the latter, and which are substantially inert to the polymer blend, such as butane, propane, etc.
3. Solid foaming agents which autogeneously produce inert gases which are substantially inert to the polymer blend, during the melting or extruding of the polymer blend, such as azodicarbonamide, paratoluenesulfonyl semi-carbazide, etc.

Those foaming substances or blowing agent may be in the form of compressed foams in the molten polymer or dissolved or dispersed and suspended in the molten polymer blend in the die, because the inside of the die is maintained at appreciably higher pressures than atmospheric, due to the extrusion pressure. The quantity of the foaming substance to be added to the molten polymer blend may be suitably selected, depending on the type and properties of the specific foaming substance, type and properties of the polymer blend, and extruding conditions, etc. The amount of the foaming substance to be added will be determined easily by people skilled in the art by performing routine experiments. For instance, when an inert gas is used as the foaming substance, it may be introduced into the melt at a ratio of 10 – 50 cc/g (based on the polymer blend), at a pressure of 10 – 50 Kg/cm$^2$. If a volatile organic liquid is used as the foaming substance, it is generally added at a ratio of 5.0 – 30.0% by weight based on the weight of the polymer blend. When a solid foaming agent as named above is used, it is preferably added at a ratio of 0.5 – 5.0% by weight based on the weight of the polymer blend.

The mixture of resinous blend and the foaming substance are supplied to the extruder and melted at a temperature above the melting temperature but below the decomposition temperature of the polymers by the same means as in the case of making ordinary foamed sheets. For example, the pellets or powder of each polymer together with other additives, as required, is fed to the hopper on the screw extruder, and melted and kneaded in the extruder. The foaming substance may be introduced, when it is a gas, through the gas inlet provided on the extruder, or it may be sprinkled over the pellets or powders when it is liquid, or introduced through the hopper together with the resin when it is a solid.

The molten resinous blend containing a foaming substance is then extruded through the die. In this case it is important to use a die having a slit clearance of 0.1 – 1.0 mm. The form of the die may be either T-die or circular die. Particularly, it is preferable that the die has a slit space of 0.15 – 0.55 mm. When the slit space of the die is narrower than 0.1 mm, the sheetformed fibrous structures extruded therethrough are apt to break, and manufacture of the sheet material at high draft ratio and high productivity is rendered impossible. Conversely, when the slit width exceeds 1.0 mm, the quenching of the extrudate is rendered insufficient, and fine and uniform foaming is hindered. Furthermore, the cracking due to rupture of the foams becomes non-uniform and insufficient, and the intended product cannot be obtained.

A widely used die may be employed in the process of this invention. The pressure at the time of extruding the molten resin composition from the die may be determined depending on the clearance of die lips and kinds of resins used, but usually ranges roughly from 50 to 150 kg/cm$^2$. The extrusion speed, though dependent upon the amount of the molten resin composition blown and clearance of the die lips, practically ranges from 30 – 200 cm/min., and preferably 50 – 150 cm/min.

The extrudate is then quenched to a temperature below Tg of the blend. What is important at that moment is to quench the extrudate at a point less than 5 mm away from the die surface, ie., to quench the extrudate as soon as it leaves the die exit.

As already mentioned, the resinous blend which is employed in this invention has two Tg's. But, for practicing the the process of this invention, it is not necessary that the extrudate is quenched to a temperature below the two Tg's, but it will suffice to quench it to a temperature below the higher one of the two Tg's. Therefore, in the specification, Tg in the expression "quench to a temperature below Tg of the blend" means the higher one of the two Tg's.

There is no problem if the quenching temperature is lower than the Tg of the blend. But when the quenching temperature is near Tg, the fibrillation of the extrudate will become nonuniform and coarse. Therefore, after having left the die exit, the extrudate is preferably quenched to a temperature lower than the Tg of the molten resin by at least 5°C. Upon quenching the extrudate to the temperature below Tg, fine and uniform foams are formed in the extrudate, and the degree of split-off of the extrudate is markedly promoted. A uniform and finely reticulated structure can thus be prepared. If the extrudate is drafted at or above the Tg of the polymer, the split-off of the extrudate takes place non-uniformly as already mentioned, and the resulting sheetformed products acquire large nodes and lack pliability. The quenching may be effected by any conventional means as long as the extrudate is quenched to a temperature below the Tg of the blend at a zone less than 5 mm away from the die surface. For example, a suitable cooling medium may be blown against the extrudate, jetted through a nozzle mounted closely to the die exit, or the die lips may be cooled by some external means. In the former example, the jetting nozzle of the cooling medium should be positioned either in contact with the die exit or spaced from the exit; in the latter case the distance therebetween should be less than 5 mm. Useful cooling media may be gases or liquids which are inert to the molten polymer blend. Examples of such gases include air, nitrogen gas, carbon dioxide, but air is preferred. The preferred liquid medium is water. The temperature of the cooling medium should be low enough to quench the molten resinous blend extruded through the die to a temperature below the Tg of the blend immediately after it has left the die exit. Hence the temperature of the cooling medium used varies over a wide range depending on the Tg of the blend used. For example, since the resinous blends used in this invention have a relatively high Tg, air of room temperature or cooled a little may simply be blown thereto to attain the object of quenching sufficiently.

Another important feature of the process of the present invention that distinguishes the same over the prior known fibrillating methods is the step of drafting the extrudate simultaneously with the extrusion at a draft ratio between the maximum draft ratio possible under the conditions and one-third thereof, in order to fibrillate (split) the extrudate simultaneously with the extrusion, without passing the extrudate through the state of a foamed sheet.

In this invention, in order to draft the extrudate at a specific draft ratio without forming a foamed sheet, there may be provided at least a pair of take-up rollers maintained at some distance from the die exit, which takes up the extrudate at a take-up speed represented by the following relation but keeping the draft ratio within the afore-mentioned range.

$$\text{draft ratio} = \frac{\text{take-up speed of extrudate by take-up rollers}}{\text{extrusion speed of molten resin at die exit}}$$

The extrusion speed is determined by the amount of molten resin blown and the clearance of the die lips, and the take-up speed is determined by the surface speed of the take-up rollers. If the draft ratio exceeds its maximum value, the sheet-like material extruded through the die will be broken, and if it is less than one-third of the maximum draft ratio, the thickness of the extruded sheet will not be reduced satisfactorily, resulting in insufficient fibrillation of the extrudate. Consequently, the deniers of the fibers composing the resulting sheet-formed reticulated fibrous structures become non-uniform and too large. The specific draft ratios of extrudates vary widely depending on the types of polymers, temperature of the extrudate to be drafted and so on. Usually, it is preferred that the draft is effected at its maximum draft ratio or at a ratio near to it, and advantageously over the range of maximum draft ratio to three-fourths of the maximum.

In this way, according to the process of this invention, the sheet-formed fiber structures which are fibrillated at the time of extruding the molten resin composition, are obtained.

The sheet-formed fibrous structures thus obtained in accordance with the process of the present invention under the above described conditions possess numerous non-continuous cracks or splits along the direction of drafting, extremely fine and numerous fibers forming a reticulated structure and directed in one direction and very finely spaced from each other. That is, the structures are not opened into fibers. As already mentioned, the structures are valuable for various utilities as fibrillated. Also, at least two of the unopened, sheet-formed and reticulated fibrous structures may be superposed with the directions of their cracks or splits conformed to each other, pulled in the direction perpendicular to the direction of fibers and extended. Thus the sheets are opened and made into a physically uniform, reticulated structure, the contact area and entanglement between the sheets being remarkably increased.

This sheet can be used as such as an absorbent for oils or various organic solvents. It has been found that by subjecting this sheet to a crimping treatment, the rate and amount of absorption can be markedly increased. This crimping treatment results in increased intertwining between the constituent fibers, which in turn leads to increased mechanical strength against repeated use. The crimping of the sheet can be performed by subjecting the resulting opened reticulated laminated structure to a conventional crimping procedure such as heat shrinking, heat crimping, stuffer crimping, gear crimping or solvent treatment.

However, it has now been found that when the fibers are crimped by heat shrinking, particularly free heat shrinking, the oil or organic solvent absorbing capability of the fibrous structure is unexpectedly increased over other crimping techniques. This is believed to be because these fibers are not drawn and heat set as with conventionally crimped fibers, and a high number of crimps per unit area is thereby obtained. The heat shrinking treatment is preferably carried out to an extent, in terms of area shrinkage, of 5 to 70%, especially 15 to 40%. Preferably, shrinkage is carried out with the laminate in a relaxed condition.

The heat shrinking treatment can be performed, for example, by feeding the resulting opened laminate into a conventional dryer (for example, hot air dryer) maintained at 80° – 150°C., preferably 90° – 120°C. so that the residence time will be 1 to 15 minutes, preferably 2 to 5 minutes.

In order to render the crimped structure more durable, a small amount of a binder, especially one having good affinity with oils, for example an emulsion of a resin such as petroleum resin, polybutene, polyisobutene, atactic polypropylene or polystyrene may be impregnated into the surface layer of the crimped structure. This process results in cohering the individual fibers in the surface layer and partially prevents the occurrence of fuzz. Furthermore, the laminated fibrous structure may be partially heat sealed, for example by needling with heated needles, or be subjected to an ordinary needling treatment.

The opened, sheet-like, reticulated fibrous structures may be superposed on, or laminated with two or more sheet-like structures which may be the same or different, for example, an unopened, sheet-like and reticulated fibrous material having numerous non-continuous cracks along one direction, prepared by the procedure described above from the same or different polymers employed in the opened structures; or two such materials superposed with their directions of cracks being the same; or such other sheet or sheets similarly opened, prior to crimping.

According to the present invention, it is also possible to superpose at least two sheets of the product of the process of this invention prior to opening, that is, the unopened sheet-like and reticulated fibrous structures, with their directions of cracks being the same; pull the laminate in a direction perpendicular to the direction of cracks to separate the constituent fibers; before or after crimping, superpose the resulting opened web or the laminate of the webs with other unopened or opened sheet material, with a reinforcing layer or layers; and thereafter bind the laminate to form an integral and reinforced composite structure having improved physical properties. The superposing of the reinforcing material can be effected by placing the latter on one side of the laminate or between the laminate-forming layers, or interposing the latter between two of such webs or laminates.

Examples of the reinforcing layers to be employed in the above embodiment are papers such as pulp paper and synthetic paper; woven or knitted goods; non-woven fabrics such as glass mat and non-woven fabrics of natural, semisynthetic and synthetic fibers; films such as synthetic resin film and regenerated cellulose films; and foamed sheets, knitted fabrics being preferable.

Hereinafter the process of this invention will be explained in further detail as to preferred embodiments, with reference to the attached drawings.

FIG. 1 is a plan view of a preferred arrangement for making the unopened, sheet-formed fibrous structures in accordance with the process of the present invention;

FIG. 2 is a cross section of the apparatus shown in FIG. 1, cut along the line A—A;

FIG. 3 is a flow chart showing a preferred embodiment for making the oil or organic solvent-absorbent; and, FIG. 4 is a diagrammatic view showing the manner of opening the web of unopened, sheet-formed and reticulated fibrous structure.

Referring to FIGS. 1 and 2, molten mixture 4 of a resinous blend and a foaming substance is extruded through the die 1 having a slit 2 of 0.1 – 1.0 mm in width. The foaming substance may already be forming foams 6, or not yet foamed due to the extrusion pressure exerted inside the die. In both cases the foam grows as soon as the molten mixture 4 is extruded through the slit 2 and released from the extrusion pressure. At the die exit, a cooling means 3 is provided either in contact with the exit or spaced therefrom by less than 5 mm, to blow a cooling fluid against the extruded polymer (in the direction indicated by the arrow b in FIG. 2). Therefore the molten mixture extruded through the die is quenched to a temperature below the Tg of the blend, preferably by at least 5°C. Consequently, the foaming of the blend as above-described is not performed in an uncontrolled manner but effected finely and uniformly, by the quenching of the molten polymer blend. The polymer blend extruded and quenched immediately after leaving the die exit is simultaneously drafted in the direction of arrow a, by means of the take-up roller 7 positioned suitably spaced from the die exit, for example, by 200 mm. The drafting is accomplished by suitably adjusting the extrusion rate and rotation speed of the take-up roller, so as to make the draft ratio a value within the range of the maximum feasible draft ratio under the operating conditions, to one-third thereof.

Upon quenching and simultaneous drafting of the extruded polymer blend, the numerous foams in the polymer collapse to form numerous cracks in the direction of arrow a in FIG. 2, thereby providing an unopened, sheet-formed and reticulated fibrous structure which has numerous noncontinuous cracks along one direction.

The resulting sheet-formed structure can be wound up onto a take-up roller (not shown), or may be sent to the next processing step as it is.

FIG. 3 explains the procedure of laminating at least two sheets of the unopened structure, opening the laminate and integrating them by exerting suitable pressure. The plural webs 11, 11' (in FIG. 3, two sheets are shown to be superposed, but if desired, more than two sheets can be laminated, using more than two takeup rolls) of the unopened, sheet-formed and reticulated fibrous structures as respectively wound up onto two take-up rolls are first sent to the first supply roll 12 and second supply rolls 13. As desired, the webs 11 and 11' may be colored uniformly or differently. Then the superposed sheets are opened between the second supply rolls 13 and preliminary press rolls 15. The opening of the fibrous structures can be accomplished by the web holder 18 mounted between the second supply rolls 13 and preliminary press rolls 15 and which opens fanwise from the second supply rolls toward the preliminary press rolls as best seen in FIG. 4. In the embodiment of FIG. 4, Lo/Li corresponds to the opening ratio, which preferably ranges from 3 to 15 according to the subject invention.

The superposed and opened web 14 is optionally further superposed or laminated with other fibrous structures and/or reinforcing layer such as knitted fabrics (not shown), before it is subjected to the free heat-shrinkage. Then the laminate is passed through the preliminary press rolls 15. Thus, a laminated, integral sheet-formed material is fed into a heat-shrinking apparatus 16 such as an air-dryer and crimps are thereby produced to the fibers of the laminated sheet. The crimped, laminated fibrous structure is sent to cutting and heat-sealing steps (not shown) with or without prior wind-up on roller 19, whereby there is provided an oil or organic solvent-absorbant product.

The absorbent according to this invention is useful for absorbing and removing oils which have flowed out onto the surfaces of sea or rivers, preventing the intrusion of oils to oyster culture farms, for example, absorbing and removing waste oils from industrial wastes. The oils to be removed may, for example, be crude oils, heavy oils, light oils, machine oils, kerosene, and vegetable oils.

The absorbing material of this invention can also be used to absorb and remove organic solvents, such as aromatic hydrocarbons, for example, toluene, xylene or benzene, ethers, ketones, phenols, halogenated hydrocarbons, or aliphatic hydrocarbons, which are afloat or suspended in air or in waste water.

The following Examples will specifically illustrate the present invention.

In the Examples, the absorbability and the amount of oil absorbed were measured by the following methods.

B heavy oils were put afloat on the water surface to a depth of 5 mm in an atmosphere at 20°C., and a test piece with a size of 20 cm × 20 cm was put afloat thereon to conduct an oil absorption test.

OIL ABSORBABILITY AND AMOUNT OF OIL ABSORBED

After the oil had been impregnated into the entire surface layer of a test piece, the test piece was maintained for 1 minute in this state. It was then withdrawn from the oil, and maintained for 30 seconds. The weight of the test piece was measured to determine the amount of oil absorbed. The value obtained was multiplied by 25, and the amount of oil absorbed was expressed in a unit of Kg/cm². The amount of oil impregnated was expressed by a factor of the weight of the test piece and defined as the oil absorbability.

EXAMPLES 1 TO 5

A mixture of 100 parts of a blend of 60 to 99 parts of polystyrene and 40 to 1 parts of polyethylene, 0.5 part of talc and nitrogen gas as a foaming agent was extruded at an extrusion rate of 23 g/min., from a die having a slit aperture 0.225 mm width and 150 mm length while the die temperature of the extruder was being maintained at 260°± 5°C. The extrudate was cooled by applying cooling air at a position immediately below the die by the cooling apparatus provided in contact with the die, and simultaneously wound up at the maximum draft while being quenched to 60°C. at the die exit. The sheet extruded from the die slip of the extruder was very finely ruptured to form a network fibrous structure.

400 sheets of the fibrous structure so obtained were superposed, and extended laterally to 10 times the original length using a tenter. The fibrous structure was then free heat-shrunk at 93°C. for 5 minutes, and then partly heat-sealed.

For comparison, the same procedure as above was repeated except that as the polymer, each of 100 parts of polystyrene, a blend of 11.5 part of polystyrene and 0.5 part of polyethylene and a blend of 55 parts of polystyrene and 45 parts of polyethylone were used.

The results are shown in Table 1.

TABLE 1

| Examples Nos. | Polymer composition | | Tg (°C) | Oil Absorbability* (times) | Amount of oil absorbed (Kg/m²) |
|---|---|---|---|---|---|
| | Poly-Styrene | Poly-ethylene | | | |
| 1 | 99 parts | 1 part | 76 | 25 | 6.0 |
| 2 | 90 | 10 | 76 | 32 | 7.7 |
| 3 | 80 | 20 | 75 | 39 | 9.3 |
| 4 | 70 | 30 | 75 | 30 | 7.2 |
| 5 | 60 | 40 | 74 | 26 | 6.2 |
| Comparison | | | | | |
| 1 | 100 | — | 80 | 20 | 4.8 |
| 2 | 99.5 | 0.5 | 76.5 | 21 | 5.0 |
| 3 | 55 | 45 | 74 | 18 | 4.3 |
| Commercially available oil-absorbing material | Polypropylene | | — | 10 | 4.5 |

TABLE 1-continued

*Oil absorbability = $\frac{\text{weight of oil absorbed}}{\text{weight of absorbent prior to oil absorbing}}$

EXAMPLE 6

A mixture of a blend (Tg − 76°C.) of 97.5 parts of polystyrene and 2.5 parts of polyethylene and nitrogen gas as a foaming agent was extruded through a die with a slit aperture of 0.225 mm width and 150 mm length while maintaining the temperature of the die at 260°C. Cooling air was blown against the extrudate at a position immediately below the die by the cooling apparatus provided in contact with the die, and the extrudate was wound up at a draft ratio of 150 (maximum) while the extruded resin at the die exit was being quenched to 60°C. The sheet extruded from the die slit of the extruder was very finely ruptured to form a reticulated fibrous structure. 720 sheets of the reticulated fibrous structures were superposed, and extended laterally to 10 times the original length using a tenter. Then, the fibrous structure was crimped by free heat shrinking for 5 minutes at 93°C., and partly heat-sealed (product A).

For comparison, the above procedure was repeated except that the crimping was not performed thereby to form product B. Furthermore, the above procedure was repeated except that the sheets of the reticulated fibrous structures in the superposed state were not extended, thereby to form product C.

The oil absorbability and oil absorbing rate of the products obtained are shown in Table 2.

TABLE 2

| | Thickness (mm) | Unit weight (g/m²) | Apparent density (g/m³) | Oil absorbability (times) | Amount of oil absorbed (kg/m²) |
|---|---|---|---|---|---|
| Product A (this invention) | 4.8 | 270 | 0.056 | 27 | 7.5 |
| Product B (comparison) | 2.1 | 270 | 0.13 | 11.5 | 3.1 |
| Product C (comparison) | 3.1 | 270 | 0.087 | 19.5 | 5.3 |

What we claim is:

1. A process for the preparation of an oil or organic solvent-absorbent, which comprises:
   a. extruding a molten mixture of a resinous blend consisting essentially of 60 to 99 parts by weight of polystyrene and 1 to 40 parts by weight of polyethylene and a foaming agent through a die with a slit clearance of 0.1 – 1.0 mm;
   b. quenching the extrudate at a point less than 5 mm away from the die surface to a temperature below the highest glass transition temperature exhibited by the resinous blend;
   c. simultaneously drafting the extrudate at a draft ratio between the maximum draft ratio possible under the conditions and one-third thereof, thereby fibrillating the extrudate just as it leaves the die exit;
d. laminating at least two sheets of the thus-obtained unopened, sheet-like and reticulated fibrous structures so that the directions of the fibers of these structures are identical to each other;
e. pulling the laminate in the direction perpendicular to the direction of the fibers to open the same; and
f. subjecting the opened, sheet-like laminate to heat shrinking treatment at a temperature ranging from 80° to 150°C. to develop crimps in the fibers.

2. The process of claim 1 wherein said resinous blend consists essentially of 75 to 98 parts by weight of polystyrene and 2 to 25 parts by weight of polyethylene.

3. The process of claim 1 wherein said extrudate is quenched to a temperature at least 5°C. lower than the glass transition temperature of the resinous blend, by blowing cooled air against said extrudate just as it leaves the die.

4. The process of claim 1 wherein said draft ratio is effected between the maximum draft ratio possible under the conditions and three-fourths thereof.

5. The process of claim 1 wherein said heat shrinking treatment is carried out after superimposing said opened, sheet-formed laminate with at least one other sheet-formed material.

6. The process of claim 5 wherein said other sheet-formed material is a knitted fabric.

7. The process of claim 1 wherein said heat shrinking treatment is carried out to an extent, in terms of an area shrinkage, of 5 to 70%.

8. The process of claim 1 wherein said heat shrinking treatment is carried out for 1 to 15 minutes.

9. The process of claim 1 wherein the heat shrunk laminate is impregnated with a binder having good affinity with oil or organic solvent.

10. The process of claim 1 wherein the heat shrunk laminate is partly heat sealed.

11. The process of claim 1 wherein the die of step (a) has a slit clearance of 0.15–0.55 mm.

12. The process of claim 1 wherein the die slit of step (a) has a slit clearance of about 0.225 mm.

13. The oil or organic solvent-absorbent produced by the process of claim 1.

14. A process for removing oil from the surface of a body of water comprising contacting said surface with an oil absorbent as defined by claim 13.

15. The oil or organic solvent-absorbent produced by the process of claim 2.

16. A process for removing oil from the surface of a body of water comprising contacting said surface with an oil absorbent as defined by claim 15.

17. The oil or organic solvent-absorbent produced by the process of claim 3.

18. A process for removing oil from the surface of a body of water comprising contacting said surface with an oil absorbent as defined by claim 17.

19. The oil or organic solvent-absorbent produced by the process of claim 5.

20. A process for removing oil from the surface of a body of water comprising contacting said surface with an oil absorbent as defined by claim 19.

21. The oil or organic solvent-absorbent produced by the process of claim 7.

22. A process for removing oil from the surface of a body of water comprising contacting said surface with an oil absorbent as defined by claim 21.

23. The oil or organic solvent-absorbent produced by the process of claim 9.

24. A process for removing oil from the surface of a body of water comprising contacting said surface with an oil absorbent as defined by claim 23.

25. The oil or organic solvent-absorbent produced by the process of claim 10.

26. A process for removing oil from the surface of a body of water comprising contacting said surface with an oil absorbent as defined by claim 25.

27. The oil or organic solvent-absorbent produced by the process of claim 11.

* * * * *

UNITED STATES PATENT AND TRADEMARK OFFICE
CERTIFICATE OF CORRECTION

PATENT NO. : 3,966,597
DATED : June 29, 1976
INVENTOR(S) : OMORI, ET AL.

It is certified that error appears in the above-identified patent and that said Letters Patent are hereby corrected as shown below:

Item 73, delete "Osalin", insert -- Osaka --

Signed and Sealed this

Twenty-first Day of September 1976

[SEAL]

Attest:

RUTH C. MASON
*Attesting Officer*

C. MARSHALL DANN
*Commissioner of Patents and Trademarks*